Patented Apr. 30, 1940

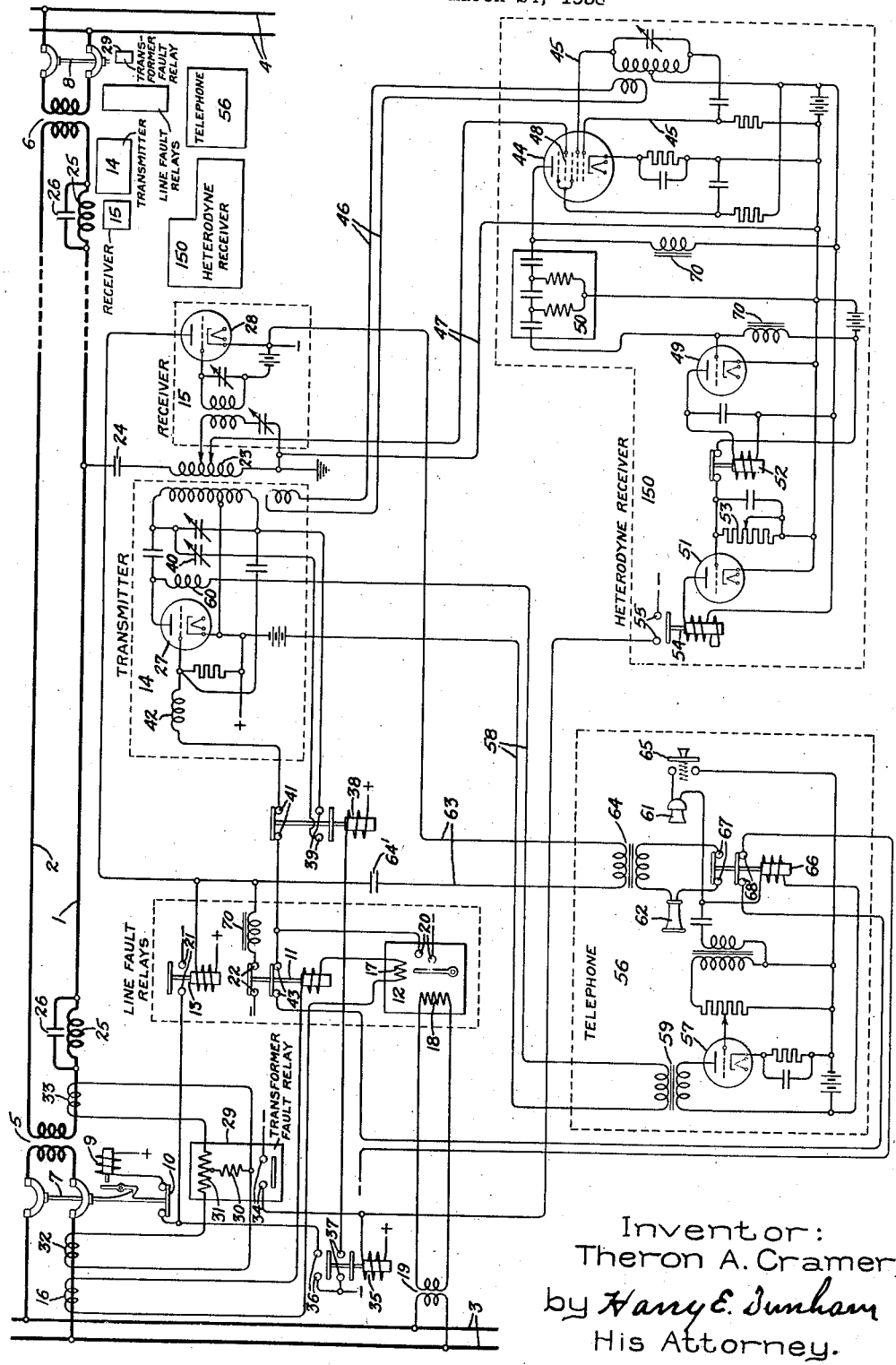

2,199,168

UNITED STATES PATENT OFFICE 2,199,168

PROTECTION OF ELECTRIC POWER SYSTEMS

Theron A. Cramer, Schenectady, N. Y., assignor to General Electric Company, a corporation of New York Application March 24, 1938, Serial No. 197,824

17 Claims. (Cl. 175—294)

My invention relates to improvements in the protection of electric power systems and more particularly to improvements in protective arrangements wherein the desired discriminating action necessary for continuity of service is obtained by the use of fault responsive relays and a suitably transmitted auxiliary current.

In the discriminating protective arrangements, known to the art as carrier current pilot protective arrangements, a relatively high frequency current is transmitted, usually over the power line conductors of a section of the electric system on the occurrence of faults external to the section, whereby to prevent the fault responsive relays from tripping the circuit breakers at the ends of the section. In this way continuity of service is maintained on sound portions of the system. On internal faults no auxiliary current is transmitted and the fault responsive relays effect the tripping of the circuit breakers at the ends of the section.

Occasions arise where this type of protection alone is not sufficient. For example, when a power line section includes electrical apparatus such as a power transformer at each end with a circuit breaker on the low voltage side of the transformer, a fault on the transformer at one end may not draw enough current from the other end to insure the intended operation of the carrier current pilot protective arrangement. Nevertheless, both circuit breakers should be quickly opened in order to prevent any current flow to a faulty transformer. While the transformer at each end may have its own fault responsive protective means for tripping its associated circuit breaker on the occurrence of a fault in the transformer, this does not of itself protect against the inflow of fault current from the other end. Moreover, for reasons of economy and simplicity, it is often desirable to use the transmitted auxiliary current for other purposes than protection, for example, telegraphy, telephony, telemetering, and the like. Protection purposes, however, must have precedence over these strictly communication services. Furthermore, since the carrier current pilot protective arrangement may not respond to transformer faults, it is preferable that the transformer fault responsive means have precedence over the carrier current pilot protective arrangement. Also, in order to reduce the chances of false tripping, it is important that the equipment contain no tuned circuits which are likely to be shocked into oscillation by line transients.

In accordance with my invention, I provide an improved protective arrangement whereby the operation of the fault responsive means associated with one transformer effects, in conjunction with the transmitted auxiliary current, the opening of the circuit breaker at each end of the section by what may be termed a transfer trip action. I also provide an improved protective arrangement wherein the transformer protective means has precedence over the carrier current protective arrangement in the use of the transmitted auxiliary current, and both protective arrangements have precedence over the use of the transmitted auxiliary current for strictly communication purposes. Further, in accordance with my invention, I provide an improved protective arrangement which has no limitations in the use of the transmitted auxiliary current upon the sequence necessary to give the protective purposes the desired precedence. Also, I provide an arrangement which is subject to the minimum of interference from system transients. These and other objects of my invention will appear in more detail hereinafter.

My invention will be better understood from the following description when considered in connection with the accompanying drawing, and its scope will be pointed out in the appended claims.

The single figure of the accompanying drawing illustrates diagrammatically an embodiment of my invention as applied to a section of an alternating current power line which, for simplicity, is shown single phase by two conductors 1 and 2. As shown, these extend between two stations schematically illustrated as busses 3 and 4. Connected in the line are two power transformers 5 and 6 the low voltage sides of which are connected to the busses 3 and 4 respectively by suitable circuit interrupting means illustrated as latched closed circuit breakers 7 and 8. Each circuit breaker may be provided with a trip coil 9 and an auxiliary switch 10 of the "$a$" type, that is, one which is closed when the circuit breaker is closed and opened when the circuit breaker is opened. For simplicity, I have shown in detail the apparatus at only the station 3, but it will be understood that similar apparatus is installed at the other station 4. This is schematically illustrated by solid line rectangular blocks corresponding in general shape, size and identification to the dotted line blocks around the different apparatus units illustrated in detail at station 3.

While there are several forms of carrier current pilot protective arrangements suitable for the desired discriminatory protection of the line section between the stations 3 and 4, the particular form I have shown for the purpose of illustrating my invention is like the disclosure in Letters Patent of the United States 2,087,127, issued July 13, 1937. As shown, this arrangement comprises a fault detector relay 11, a power directional relay 12, a blocking relay 13, a transmitter 14, and a receiver 15. The fault detector relay 11 may be current responsive, voltage responsive, or both current and voltage responsive. For simplicity, it is shown as an overcurrent relay connected to be energized from a current transformer 16 which may be connected in the line betwen the bus 3 and the circuit breaker 7 so as to include as much equipment as possible in the line protection range. The power directional relay 12 has a current winding 17 connected to be energized from the current transformer 16 and a potential winding 18 connected to be energized from a potential transformer 19 across the bus 3. The power directional relay 12 tends to close its contacts 20 when the direction of flow of fault power is from the bus 3 into the line. The blocking relay 13 through its normally open contacts 21 controls the circuit of the trip coil 9. This relay has its winding connected in a circuit which is normally energized through the closed contacts 22 of the fault detector relay 11.

The transmitter 14 and the receiver 15 are coupled to the line conductor 1 by suitable means, such as a transformer 23 and a condenser 24. In order to confine the transmission to the power line section under protection, in those cases where the impedance of the power transformers is not great enough for the purpose, suitably tuned wave traps comprising a choke coil 25 and a condenser 26 may be connected in the line conductor 1 at each end between the power transformer and the coupling point of the transmitter and receiver. For simplicity, the transmitter is shown only as an oscillating valve 27 tuned to oscillate at a frequency suitable for the purposes of line protection and communication services. Since the addition of the necessary amplifying means, when such are required for the purpose at hand, will be obvious to those skilled in the art these have been omitted to simplify the understanding of my invention. The receiver 15 is shown simply as having a detector tube 28 and is tuned to the frequency for which the transmitter oscillates to take care of line protection and communication services. Here again, the application of the necessary amplifying means when required will be obvious to those skilled in the art.

For protecting the transformers against internal faults, any suitably sensitive protective arrangement, examples of which are well known to the art, may be employed. I have chosen to illustrate a well known type of differential protective arrangement which includes a relay 29 of a so-called percentage differential type having an operating winding 30 connected to be energized in accordance with the difference between the currents flowing in the two windings of the power transformer and a restraining winding 31 which is energized responsively to the sum of the currents flowing in the two transformer windings. For this purpose, the restraining winding 31 may be connected in series relation with the secondaries of current transformers 32 and 33 on opposite sides of the power transformer. These current transformer secondaries are connected in series relation with each other for circulating current under normal conditions of the power transformer. The operating winding 30 is connected across normally equi-potential points of the circulating current circuit of the current transformer secondaries. While the transformer fault relay 29 could be arranged through its contacts 34 directly to control the trip coil 9 of the associated circuit breaker, this trip coil 9 of the associated circuit breaker, this relay is in general of a very sensitive type and since, in accordance with my invention, it has other duties to perform, I may arrange to have it control the energization of an auxiliary relay 35. This relay, through its contacts 36, controls the energization of the trip coil 9 of the associated circuit breaker.

In accordance with my invention, I so arrange that, upon the operation of the transformer fault responsive means at one end of the line, the frequency of the current transmitted by the transmitter at that end is changed, and at the other end of the line a device responsive to this change in frequency operates to effect the tripping of the circuit breaker at its end. For this purpose, the auxiliary relay 35 may be arranged through its contacts 37 to effect the change in frequency of the transmitter 14 by suitable means such as a control relay 38. When this relay 38 is energized to close its contacts 39 it connects in the tuning circuit of the transmitter oscillating valve 27 suitable means such as a condenser 40 which changes the frequency of the transmitted current by a predetermined amount. Inasmuch as it is preferable for reasons heretofore pointed out that the transformer fault responsive means have precedence in control of the transmitter, the control relay 38 may have normally closed contacts 41 in the control electrode biasing circuit of the oscilating valve 27. This biasing circuit may also include a radio-frequency choke 42. The control electrode biasing circuit also includes the normally closed contacts 43 of the fault detector relay 11.

As illustrated, the means responsive to the change in frequency of the transmitted current is a heterodyne receiver 150 which is continuously oscillating at some predetermined frequency. This frequency may be the same as the frequency of the current transmitted by the transmitter for line fault protection and communication services. The heterodyne receiver 150 thus becomes operative in response to the change in frequency of the transmitted current or, considered in another way, the beat frequency between the normal oscillating frequency of the heterodyne receiver and the changed frequency of the transmitter. As illustrated, the heterodyne receiver 150 comprises in effect a low power oscillator which is operated at the same frequency as the local transmitter. The output of this oscillator is mixed with some of the incoming signal from the transmitter at the far end when it operates on the changed frequency in response to a transformer fault condition at that end.

This mixing operation can be accomplished by means of separate valves or by a multi-grid valve 44. As shown, this valve has an oscillating circuit 45—45 tuned to the normal operating frequency of the transmitter 14. In order to minimize any undesired frequency drift which may occur as a result of temperature and voltage variations, a stabilizing link circuit 46 may be used to couple the oscillating circuit 45 of the oscillator valve 44 and the transmitter 14. This circuit 46 in effect constitutes a synchronizing tie between the transmitter 14 and the oscillator valve 44. The strength of this synchronizing tie can be controlled at will by the degree of coupling to the transmitter. Obviously this degree of coupling is so arranged that it cannot maintain synchronism when the frequency of the transmitted current is changed in response to the operation of the transformer fault responsive means 29. This changed frequency current is impressed on the oscillator valve 44 through a circuit 47 which includes the mixing grid 48 of the oscillator valve 44.

As shown, the output of the oscillator-mixer or converter valve 44 is used to control suitable relaying means for effecting the tripping of the local circuit breaker. For this purpose, the output of the valve 44 may be applied to the control electrode of a relay valve 49 through a high-pass filter 50. The output of the relay valve 49 is used to control a time delay valve 51 through the normally closed contacts of a relay 52 in the anode circuit of the relay valve 49. The time delay action of the valve 51 results from the delayed discharge of the condenser-resistor circuit 53. A relatively long time delay of this character is desirable in order to avoid possibilities of erroneous operation due to line transients. The output of the valve 51 controls the energization of an auxiliary relay 54 which through the closing of its contacts 55 can effect the energization of the auxiliary relay 35 and through the contacts 36 of this relay the completion of the trip coil circuit of the circuit breaker 7. In order to avoid any possibility of erroneous operation of the auxiliary relay 54 in consequence of local wiring circuit transients, this relay may be arranged to have a relatively short time delay in its own inherent operation. For this purpose it may be of the so-called hesitating type provided with a short-circuited winding to delay the pick-up. A construction of this type also produces a time delay in the drop-out of the relay 54, but this is also advantageous because it insures a positive operation of the auxiliary relay 35 and thereby a definite tripping action.

Inasmuch as there is no synchronizing tie available between the transmitter at one end and the heterodyne oscillator at the other end, there is a possibility of frequency drift between these two due to voltage, temperature, and other variations which conceivably might effect the energization of the relay valve 49. It is for this reason that the high-pass filter 50 is used. This high-pass filter 50 is so tuned as to provide high attenuation for frequencies below the beat frequency which is to effect the circuit breaker tripping operation.

So far there have been discussed only the protective phases of apparatus embodying my invention. It is frequently desirable to have one or more forms of communication service and as a matter of simplicity and economy to make use of the transmitting and receiving apparatus installed for protection purposes. The communication service may take any one or more forms. I have chosen to illustrate a high frequency telephone arrangement. As shown, the telephone 56 comprises a modulator valve 57 suitably coupled to the transmitter oscillator valve 27 through a circuit 58 comprising an impedance matching and insulating transformer 59 and a radio frequency choke coil 60. The telephone 56 also includes a suitable transmitter microphone 61 and audio-receiver 62. This audio-receiver is coupled to the detector valve 28 of the receiver 15 through a circuit 63 which includes an impedance matching and insulating transformer 64 and a direct current blocking condenser 64'. The telephone set is under the manual control of a push button switch 65. For controlling the audio-receiver 62 and also to give precedence to the protective apparatus, the push button switch 65 is arranged to control the energization of an auxiliary relay 66 which has normally closed contacts 67 in the circuit of the audio-receiver 62 and normally closed contacts 68 in the grid biasing circuit of the transmitter 14. Thus at any time when the telephone set is in service the bias is removed from the transmitter 14 so that it can operate but inasmuch as the contacts 20 of the power directional relay 12 can close for conditions under which tripping should occur and since these contacts are connected in the biasing circuit of the grid of the oscillator valve 27 closer to the grid than the contacts 68 of the auxiliary relay 66, the transmitter 14 can immediately be stopped for any conditions under which tripping on the line section should occur.

Assuming the parts positioned as shown in the drawing and also no fault on the power line section between the busses 3 and 4, then if the operator at one station, for example 3, desires to communicate with the operator at station 4, he closes the push button switch 65. This completes the circuit of the auxiliary relay 66 which opens the circuit of the audio-receiver 62 at contacts 67 and also opens the grid biasing circuit of the transmitter oscillator valve 27 at the contacts 68. In this way the transmitter is started. The operator at station 3 can then communicate with the operator at station 4 by way of the microphone 61 as it is assumed that the operator at station 4 has not also closed the push button switch 65 at that station.

If at any time during the telephone communication the line section is subjected to a fault such as would cause the power directional relay 12 to close its contacts 20, the negative bias is immediately restored to the grid of the transmitter oscillator valve 27 so that transmission will be stopped in order to permit tripping if the fault is in the line section. Assuming, for example, that there is a fault, such as a short circuit between the conductors 1 and 2 in the line section between the stations 3 and 4, then with power flow into the section from each end, the fault detector relay 11 at each station operates to open its contacts 22 and 43 whereby to open the circuit of the winding of the blocking relay 13 and to remove the bias on the grid of the transmitter oscillator valve 27. The circuit of the winding of the blocking relay 13 may include an audio-frequency choke 70. Such chokes 70 may be applied in other circuits, where necessary, as will be obvious to those skilled in the art. Upon the removal of the bias from the grid of the transmitter oscillator valve 27 a brief interval of transmission may occur but, since the flow of fault power at station 3 is from the bus to the line, the fault directional relay 12 will close its contacts 20 to restore the bias on the transmitter grid and thereby stop transmission. Similar operation will take place at station 4 and consequently the blocking relay 13 which is connected in the output circuit of the receiver at its own station will be deenergized after the opening of its circuit by the fault detector relay at the station and the closing of the contacts 20. The blocking relays, accordingly, close their contacts 21 and effect the tripping of the circuit breakers at the respective stations.

If, however, the fault is on the system at some point outside of the section between the stations 3 and 4, for example a section extending from station 4, then the power directional relay at station 4 will not operate to close its contacts and stop the transmitter at station 4 because the flow of fault power is from the line section to the bus at station 4. The receiver 15 at station 4 and the receiver 15 at station 3 will be energized by transmission from the transmitter 14 at station 4. Consequently the blocking relay 13 at each station will be energized from the receiver at the station to maintain its contacts 21 open and thereby prevent tripping of the circuit breakers.

Assuming that a fault occurs in one of the power transformers, for example the transformer 5 at station 3, then the transformer fault relay 29 will operate to close its contacts 34. This completes the circuit of the auxiliary relay 35 which closes its contacts 36 to trip the circuit breaker 7 and its contacts 37 to energize the control relay 38. This relay, when energized, opens the grid biasing circuit of the transmitter oscillator valve 27 at its contacts 41 and closes its contacts 39 to change the tuning of the transmitter so that a current of a different frequency is now transmitted over the line conductor 1 to station 4. In order to insure transmission at this different frequency long enough to be certain that tripping is effected at the far end even though the fault relay associated with the faulty power transformer should reset in response to the tripping of the local circuit breaker, the auxiliary relay 35 may be arranged so that, when once energized, its contacts 37 at least remain closed to keep the control relay 38 energized the necessary time. For this purpose, as is well known to the art, the relay 35 may be of the so-called hand reset type in which the contacts when once closed remain closed, even though the relay drops out, until reset manually or the relay 35 may be constructed to have a time delay drop-out, examples of which are well known to the art. I have found that a change in frequency of 1500 cycles provides satisfactory operation although my invention is not limited to this particular value. This change in frequency or beat frequency effect should be greater than the cut-off frequency of the high-pass filter which of itself should be tuned to a frequency high enough to avoid false operation under the greatest possible drift to be expected between the transmitter at one end and the heterodyne oscillator at the other end. The control relay 38 has its contacts 41 in the grid biasing circuit closest to the grid so as to have precedence in the control of the transmitter. The changed frequency current now transmitted by the transmitter 14 is fed through the coupling transformers 23 and the circuits 47 to the mixer valves 44 of the heterodyne receiver at each station. Consequently, the heterodyne receiver at each station operates in response to the beat frequency or frequency change in transmitted current.

The operation of the heterodyne receiver at station 3 is incidental because the circuit breaker 7 at this station has been tripped in response to the operation of the auxiliary relay 35. However, at station 4 the heterodyne receiver 150 is energized to effect the operation of the relay 52 and the time delayed action of the relay 54 which closes its contacts 55 in the circuit of the auxiliary relay 35 at station 4. This relay, upon energization, closes its contacts 36 whereby to effect the tripping of the circuit breaker 8 at station 4. Thus in case of a fault in either of the power transformers which does not produce enough fault current to cause the operation of the carrier current pilot protective system, the circuit breaker associated with the faulty transformer is tripped, and this action is in effect transferred to the circuit breaker at the other end of the section by virtue of the change in the frequency of the current transmitted by the transmitter at the station where the fault occurs. With the arrangement shown, it will be obvious that insofar as the transmitter is concerned the transformer fault responsive means has preference in control of the transmitter over the other forms of protection and communication service. The line fault responsive relay means has preference over the communication services. While I have shown only one form of strictly communication service for use of the transmitting and receiving apparatus illustrated, it will be obvious to those skilled in the art that other forms of communication service may be provided with the limitation that the protective arrangements shall have precedence over any communication service.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is:

1. In combination, a power line, electrical apparatus connected in said line at one point thereof, circuit interrupting means in said line adjacent said apparatus, circuit interrupting means in said line at another point remote from said apparatus, means for transmitting an alternating auxiliary current from said one point to said other point, means responsive to faults in said apparatus for effecting the operation of the circuit interrupting means at said one point and for causing said transmitting means to transmit current of a predetermined frequency, a source of alternating current of another predetermined frequency, and means at said other point responsive to the difference between the frequencies of said two currents for effecting the operation of the circuit interrupting means at said other point.

2. In combination, a power line, electrical apparatus connected in said line at one point thereof, circuit interrupting means in said line on one side of said apparatus, circuit interrupting means in said line at another point remote from said appaartus, means adjacent said one point for transmitting a current of a predetermined frequency, fault responsive means adjacent said one point arranged to be energized from said line to respond to faults in said apparatus, means controlled by said apparatus fault responsive means for changing the frequency of the current transmitted by said transmitting means, and means adjacent said other point operative in dependence on said changed frequency current to effect the opening of the circuit interrupting means adjacent said other point.

3. In combination, a power line, a power transformer connected in said line at one point thereof, circuit interrupting means in said line on one side of said transformer, circuit interrupting means in said line at another point remote from said transformer, means for causing the opening of said circuit interrupting means only on the occurrence of a fault between said points comprising a carrier current pilot protective system including a transmitter adjacent said one point for transmitting a current of a predetermined frequency and a receiver adjacent said other point tuned to said predetermined frequency, fault responsive means associated with said transformer operative on the occurrence of a fault thereon to disconnect the circuit interrupting means associated with the transformer, means controlled by said transformer fault responsive means for changing the frequency of the current transmitted by said transmitter, and means adjacent the other point operative in dependence on said changed frequency current to effect the opening of the circuit interrupting means at said other point.

4. In combination, a power line, two power transformers connected in said line at different points thereof, circuit interrupting means in said line on the low voltage side of each of said transformers, means for causing the opening of said circuit interrupting means only on the occurrence of a fault between said points comprising a carrier current pilot protective system including a transmitter at each of said points for transmitting a current of a predetermined frequency and a receiver at each of said points tuned to said frequency, fault responsive means associated with each of said transformers operative on the occurrence of a fault on a transformer to disconnect the circuit interrupting means on the low voltage side of the transformer, means controlled by the transformer fault responsive means at each point for changing the frequency of the current transmitted by the transmitter at that point, and means adjacent the other point operative in dependence on said changed frequency current to effect the opening of the circuit interrupting means at said other point.

5. In combination, a power line, two power transformers connected in said line at different points thereof, circuit interrupting means in said line on the low voltage side of each of said transformers, means for causing the opening of said circuit interrupting means only on the occurrence of a fault between said points comprising a carrier current pilot protective system including a transmitter at each of said points for transmitting a current of a predetermined frequency and a receiver at each of said points tuned to said frequency, fault responsive means associated with each of said transformers operative on the occurrence of a fault on a transformer to disconnect the circuit interrupting means on the low voltage side of the transformer, means controlled by the transformer fault responsive means at each point for changing the frequency of the current transmitted by the transmitter at said point, and means for effecting the opening of the circuit interrupting means at one of said points in response to the change in frequency of the current transmitted by the transmitter at the other point including a heterodyne receiver continuously oscillating at said predetermined frequency and responsive to the change in frequency of said transmitted current.

6. In combination a power line, a power transformer connected in said line at one point thereof, circuit interrupting means in said line on one side of said transformer, circuit interrupting means in said line at another point remote from said transformer, means for causing the opening of both of said circuit interruputing means only on the occurrence of a fault between said points comprising a carrier current pilot protective system including a transmitter adjacent said one point for transmitting a current of a predetermined frequency and a receiver adjacent said other point tuned to said predetermined frequency, differential protective relay means associated with said transformer operative on the occurrence of a fault thereon to disconnect the circuit interrupting means associated with the transformer, means controlled by said differential protective relay means for changing the frequency of the current transmitted by said transmitter, and means for effecting the opening of the circuit interrupting means at said other point in response to the change in frequency of the current transmitted by said transmitter including a heterodyne receiver normally continuously oscillating at said predetermined frequency and responsive to the change in frequency of said transmitted current.

7. In combination, a power line, a power transformer connected in said line at one point thereof, circuit interrupting means in said line on one side of said transformer, circuit interrupting means in said line at another point remote from said transformer, means adjacent said one point for transmitting a current of a predetermined frequency, receiving means adjacent said other point tuned to said predetermined frequency, fault responsive relay means adjacent each of said points connected to be energized from said line and cooperating with said transmitting and receiving means to effect the opening of both of said circuit interrupting means on the occurrence of a fault on the line between said points of a character to cause the operation of said fault responsive means and with line power flow in a given direction to prevent the operation of said circuit interrupting means on a line fault external to said points, fault responsive relay means adjacent said one point arranged to be energized from said line to respond to faults in said transformer, means controlled by said transformer fault responsive means for changing the frequency of the current transmitted by said transmitting means, and means adjacent said other point operative in dependence on said changed frequency current to effect the opening of the circuit interrupting means adjacent said other point.

8. In combination, a power line, a power transformer connected in said line at one point thereof, circuit interrupting means in said line on one side of said transformer, circuit interrupting means in said line at another point remote from said transformer, means adjacent said one point for transmitting a current of a predetermined frequency, receiving means adjacent said other point tuned to said predetermined frequency, fault responsive relay means adjacent each of said points connected to be energized from said line and cooperating with said transmitting and receiving means to effect the opening of both of said circuit interrupting means on the occurrence of a fault on the line between said points of a character to cause the operation of said fault responsive means and with line power flow in a given direction to prevent the operation of said circuit interrupting means on a line fault external to said points, fault responsive relay means adjacent said one point arranged to be energized from said line to respond to faults in said transformer, means controlled by said transformer fault responsive means for changing the frequency of the current transmitted by said transmitting means, and means for effecting the opening of the circuit interrupting means adjacent said other point including a heterodyne receiver adjacent said other point continuously oscillating at substantially said predetermined frequency and operative in response to the change in said predetermined frequency.

9. In combination, a power line, a power transformer connected in said line at one point thereof, circuit interrupting means in said line on one side of said transformer, circuit interrupting means in said line at another point remote from said transformer, means adjacent said one point for transmitting a current of a predetermined frequency, receiving means adjacent said other point tuned to said predetermined frequency, fault responsive relay means adjacent each of said points connected to be energized from said line and cooperating with said transmitting and receiving means to effect the opening of both of said circuit interrupting means on the occurrence of a fault on the line between said points of a character to cause the operation of said fault responsive means and with line power flow in a given direction to prevent the operation of said circuit interrupting means on a fault external to said points, fault responsive relay means adjacent said one point arranged to be energized from said line to respond to faults in said transformer, means controlled by said transformer fault responsive means for changing the frequency of the current transmitted by said transmitting means, and means for effecting the opening of the circuit interrupting means adjacent said other point including a heterodyne receiver adjacent said other point having a continuous oscillator and responsive to the difference between the frequency of said oscillator and said changed frequency.

10. In combination, a power line, a power transformer connected in said line at one point thereof, circuit interrupting means in said line on one side of said power transformer, circuit interrupting means in said line at another point remote from said transformer, means adjacent said one point for transmitting a current of a predetermined frequency, receiving means adjacent said other point tuned to said predetermined frequency, fault responsive relay means adjacent each of said points connected to be energized from said line and cooperating with said transmitting and receiving means to effect the opening of both of said circuit interrupting means on the occurrence of a fault on the line between said points of a character to cause the operation of said fault responsive means and with line power flow in a given direction to prevent the operation of said circuit interrupting means on a line fault external to said points, fault responsive relay means adjacent said one point arranged to be energized from said line to respond to faults in said transformer, means controlled by said transformer fault responsive means for changing the frequency of the current transmitted by said transmitting means, said transformer fault responsive means having precedence over said line fault responsive relay means in the control of said transmitting means, and means adjacent said other point operative in dependence on said changed frequency current to effect the opening of the circuit interrupting means adjacent said other point.

11. In combination, a power line, a power transformer connected in said line at one point thereof, circuit interrupting means in said line on one side of said transformer, circuit interrupting means in said line at another point remote from said transformer, means adjacent said one point for transmitting a current of a predetermined frequency, receiving means adjacent said other point tuned to said predetermined frequency, control means at said one point operative to control said transmitting means and means at said other point responsive to the energization of the receiving means at the point, relay means adjacent said one point arranged to be energized from said line to respond to faults in said transformer, means controlled by said transformer fault responsive means for changing the frequency of the current transmitted by said transmitting means, said transformer fault responsive means having precedence over said control means in the control of said transmitter, and means adjacent said other point operative in dependence on said changed frequency current to effect the opening of the circuit interrupting means adjacent said other point.

12. In combination, a power line, a power transformer connected in said line at one point thereof, circuit interrupting means in said line on one side of said transformer, circuit interrupting means in said line at another point remote from said transformer, means adjacent said one point for transmitting a current of a predetermined frequency, receiving means adjacent said other point tuned to said predetermined frequency, fault responsive relay means adjacent each of said points connected to be energized from said line and cooperating with said transmitting and receiving means to effect the opening of both of said circuit interrupting means on the occurrence of a fault on the line between said points of a character to cause the operation of said fault responsive means and with line power flow in a given direction to prevent the operation of said circuit interrupting means on a line fault external to said points, fault responsive relay means adjacent said one point arranged to be energized from said line to respond to faults in said transformer, means controlled by said transformer fault responsive means for changing the frequency of the current transmitted by said transmitting means, and means adjacent said other point operative in dependence on said changed frequency current to effect the opening of the circuit interrupting means adjacent said other point, and control means adjacent said one point operative to control said transmitting means, means at said other point responsive to the energization of the receiving means at said point, said transformer fault responsive means having precedence over said line fault responsive relay means in the control of said transmitter and both of the said fault responsive relay means having precedence over said control means in the control of said transmitter.

13. In combination, a power line, circuit interrupting means in said line at one point thereof, means at another point of said line for transmitting to said one point current of a predetermined frequency, control means at said other point for effecting the operation of said transmitting means, receiving means at said one point tuned to said predetermined frequency, means at said other point responsive to a predetermined fault condition of said line for causing said transmitting means to transmit a current of a different predetermined frequency, and means adjacent said one point operative in dependence on said different predetermined frequency current to effect the operation of said circuit interrupting means.

14. In combination, a power line, circuit interrupting means in said line at one point thereof, means at another point of said line for transmitting to said one point current of a predetermined frequency, control means at said other point for effecting the operation of said transmitting means, receiving means at said one point tuned to said predetermined frequency, means at said other point responsive to a predetermined fault condition of said line for causing said transmitting means to transmit a current of a different predetermined frequecy, and means adjacent said one point operative in dependence on said different predetermined frequency current to effect the operation of said circuit interrupting means, said predetermined fault condition responsive means having precedence over said control means in the control of said transmitting means.

15. In combination, a power line circuit interrupting means in said line at one point thereof, means for controlling the operation of said circuit interrupting means including means at another point of said line for transmitting to said one point current of a predetermined frequency, control means at said other point for effecting the operation of said transmitting means, and receiving means at said one point tuned to said predetermined frequency, means at said other point for causing said transmitting means to transmit a current of a different predetermined frequency, and means adjacent said one point operative in dependence on said different predetermined frequency current.

16. In combination, a power line, circuit interrupting means in said line at one point thereof, means for controlling the operation of said circuit interrupting means including means at another point of said line for transmitting to said one point current of a predetermined frequency, a first control means at said other point for effecting the operation of said transmitting means, and receiving means at said one point tuned to said predetermined frequency, a second control means at said other point for causing said transmitting means to transmit a current of a different predetermined frequency, and means adjacent said one point operative in dependence on said different predetermined frequency current, said first control means having precedence over said second control means in the control of said transmitting means.

17. In combination, a power line, circuit interrupting means in said line at one point thereof, means for controlling the operation of said circuit interrupting means including means at another point of said line for transmitting to said one point a current of a predetermined frequency, control means at said other point for effecting the operation of said transmitting means, and receiving means at said one point tuned to said predetermined frequency, means at said other point for causing said transmitting means to transmit a current of a different predetermined frequency, and a heterodyne receiver adjacent said one point operative in response to the change in frequency of said transmitted current.

THERON A. CRAMER.